3,817,899
CARBOXYLATED STYRENE/BUTADIENE
LATICES OF A HIGH SOLIDS CONTENT
Ulrich Türck, Marl, Germany, assignor to Chemische
Werke Huls Aktiengesellschaft, Marl, Germany
No Drawing. Filed Mar. 16, 1972, Ser. No. 235,395
Claims priority, application Germany, Mar. 27, 1971,
P 21 14 974.6
Int. Cl. C08d 1/09, 7/18
U.S. Cl. 260—29.7 SQ    4 Claims

ABSTRACT OF THE DISCLOSURE

Carboxylated styrene/butadiene lactices having a solids content of about 30 to 55 weight percent with a gel content less than about 1.5 weight percent generally less than about 1 weight percent comprising a polymerization product of monomers of:

A. about 45 to 85 percent by weight styrene or substituted styrenes;

B. about 15 to 55 percent by weight butadiene or substituted butadiene; and

C. about 0.5 to 5 percent by weight $\alpha$-$\beta$-unsaturated carboxylic acids having 3 to 5 carbon atoms; wherein the following components are employed in the polymerization:

D. about 0.01 to 0.5 parts by weight of an anionic emulsifier, based on 100 parts by weight of monomers A, B and C, selected from the group consisting of alkyl sulfates having 10–20 carbon atoms, alkyl sulfonates having 10–20 carbon atoms, alkylaryl sulfonates having 8–12 carbon atoms in the alkyl chain, ammonium salts of $\alpha$-sulfofatty acids having 10–20 carbon atoms and alkali salts of $\alpha$-sulfofatty acids having 10–20 carbon atoms;

E. about 0.2 to 2 parts by weight of a nonionic emulsifier, based on 100 parts by weight of monomers A, B and C, selected from the group consisting of polyglycol ethers obtained by the reaction of one mole of fatty alcohols having 10–20 carbon atoms with 3–30 moles of ethylene oxide, one mole of alkylphenols having 4–12 carbon atoms in the alkyl chain with 3–30 moles of ethylene oxide or mixtures thereof; and F. about 0.5–2 parts by weight of a water-soluble peroxydisulfate, based on 100 parts by weight of monomers A, B and C.

CROSS-REFERENCE TO A RELATED APPLICATION

Applicant claims priority under 35 U.S.C. 119 for Application P 21 14 974.6–44, filed Mar. 27, 1971, in the Patent Office of the Federal Republic of Germany.

BACKGROUND OF THE INVENTION

The field of the invention is emulsion polymerization and the present invention is related to carboxylated styrene/butadiene latices of a high solids content, having a low viscosity and a high surface tension, in the presence of an anionic and nonionic emulsifier and at an elevated temperature.

The state of the prior art may be ascertained by reference to the article by F. A. Miller, pages 1–57, in the Meyers and Long book "Treatise on Coatings," Vol. 1, Part 2, published by Marcel Dekker, Inc., N.Y. (1968); U.S. Patents 2,605,242 of Betts et al., 3,078,246 of Musch, 3,215,647 of Dunn and 3,423,351 of Pierce et al.; French Patents 1,064,657 and 1,091,062; and German published application 1,595,308.

In the technology of latex, it is desirable to produce latices which do not tend toward foaming; have a low viscosity at a high solids content; are waterproof as a film; are stable with respect to electrolytes; and are extensively free of gels. Heretofore, no latices have become known which combine all of these advantageous properties. Latices represented by the state of the art may possess one of these properties, but none of them exhibits all of the properties.

The production of styrene/butadiene latices in the presence of mixtures consisting of an anionic emulsifier and a nonionic emulsifier is conventional.

In U.S. Pat. 2,605,242, the production of a styrene-butadiene latex for paints is described, prepared in the presence of a mixture of 1–10 percent by weight of "Dresinate" (TM of Hercules Powder Co., Inc. for liquid, paste, and powder forms of sodium and potassium soaps of rosins and modified rosins used as emulsifiers, detergents, etc.), and 1–10 percent by weight of alkylphenol polyglycol ether and 0.1–3 percent by weight of an electrolyte. French Pats. 1,064,657 and 1,091,062 define styrene-butadiene dispersions which have been prepared in the presence of emulsifier mixtures. The latices produced according to the aforementioned three patents, however, contains a maximum of 45 percent solids. Furthermore, the stability of the dispersions and the waterproofness of films produced therewith are unsatisfactory due to the high emulsifier content. U.S. Pat. 3,078,246 discloses the production of frostproof styrene-butadiene dispersions which are prepared in the presence of preferably 1 percent by weight of alkylaryl sulfonate and preferably 0.5 percent by weight of the reaction product of 2–5 moles of ethylene oxide with 1 mole of alkylphenol. This patent emphasizes that the nonionic emulsifier may not contain more than 5 moles of ethylene oxide. Otherwise, the polymerization proceeds very slowly and larger amounts of coagulate are obtained. Furthermore no more than 1 percent by weight of the nonionic emulsifier is to be employed, since otherwise the aforementioned disadvantages are likewise incurred. A latex produced in accordance with the procedure of this U.S. patent resulted in 53 percent of coagulate.

U.S. Pat. 3,423,351 discloses the production of monodisperse latices in the presence of a mixture of ionic and nonionic emulsifiers. However, a styrene-butadiene latex produced according to this patent was extremely unstable and contained 1.7 percent of coagulate.

The vinyl aromatic hydrocarbon monomers disclosed beginning at line 28, column 5 of U.S. Pat. 3,423,351 are suitable as the styrene or substituted styrenes of the present invention, while the aliphatic hydrocarbons having a plurality of conjugated ethylenic double bonds disclosed beginning at line 36, column 5; the anionic surfactants disclosed beginning at line 17, column 6, and the non-ionic surfactants disclosed beginning at line 56, column 6 are suitable as the butadiene or substituted butadienes, anionic and nonionic emulsifiers of the present invention.

U.S. Pat. 3,215,647 discloses the state of art of carboxylated styrene/butadiene latices.

German Unexamined Published Application 1,595,308 discloses a process for the preparation of carboxylated styrene-butadiene copolymer dispersions containing as the comonomer 5–25 percent by weight of alkyl esters of $\alpha$-$\beta$-unsaturated acids. These copolymer dispersions are produced in the presence of a mixture of 0.5–5 percent by weight of a surface-active alkylaryl sulfonate and 2–7 percent by weight of the reaction product of an alkylphenol with 9–50 moles of ethylene oxide. A carboxylated styrene-butadiene latex produced with this emulsifier mixture has such a high viscosity that it does not flow. Additionally, 9 percent of coagulate is formed. The reaction is so violent that exact control of the reaction becomes difficult in a 12-liter kettle.

SUMMARY OF THE INVENTION

It is the objective of the present invention to produce a carboxylated styrene-butadiene latex which does not exhibit the above-described disadvantageous properties.

According to the present invention carboxylated styrene-butadiene latices are disclosed having a solids content of about 30 to 55 weight percent with a gel content less than about 1.5 weight percent generally less than about 1 weight percent, comprising a polymerization product of monomers of:

A. about 45 to 85 percent by weight styrene or substituted styrenes;

B. about 15 to 55 percent by weight butadiene or substituted butadiene; and

C. about 0.5 to 5 percent by weight $\alpha$-$\beta$-unsaturated carboxylic acids having 3 to 5 carbon atoms; wherein the following components are employed in the polymerization:

D. about 0.01 to 0.5 parts by weight of an anionic emulsifier, based on 100 parts by weight of the monomer mixture A, B and C, selected from the group consisting of alkyl sulfates having 10–20 carbon atoms, alkyl sulfonates having 10–20 carbon atoms, alkylaryl sulfonates having 8–12 carbon atoms in the alkyl chain, ammonium salts of $\alpha$-sulfofatty acids having 10–20 carbon atoms and alkali salts of $\alpha$-sulfofatty acids having 10–20 carbon atoms;

E. about 0.2 to 2 parts by weight of a nonionic emulsifier, based on 100 parts by weight of the monomer mixture A, B, and C, selected from the group consisting of polyglycol ethers obtained by the reaction of one mole of fatty alcohols having 10–20 carbon atoms with 3–30 moles of ethylene oxide, one mole of alkylphenols having 4–12 carbon atoms in the alkyl chain with 3–30 moles of ethylene oxide or mixtures thereof; and F. as an activator, about 0.5–2 parts by weight of a water-soluble peroxydisulfate, based on 100 parts by weight of the monomer mixture A, B and C.

DESCRIPTION OF THE PREFERRED EMBODIMENTS

Anionic emulsifiers employed according to this invention are surface-active alkyl sulfates or sulfonates having 10–20 carbon atoms, preferably 12–18 carbon atoms in the alkyl chain, or alkylaryl sulfonates having 8–12 carbon atoms in the alkyl chain, or salts of $\alpha$-sulfofatty acids having 10–20 carbon atoms in the chain. Suitable cations are $NH_4^+$, $Li^+$, $Na^+$, or $K^+$, or mixtures thereof. These anionic emulsifiers are employed in amounts of between 0.01 and 0.5 parts, preferably between 0.04 and 0.2 parts, based on 100 parts of monomer.

Specific examples of the anionic surfactant alkyl sulfates having 10–20 carbon atoms include:

alkalisalts of:
    dodecylsulfate,
    tetradecylsulfate,
    hexadecylsulfate,
    octadecylsulfate,
    or mixtures thereof.

The alkyl sulfonates having 10–20 carbon atoms useful as the anionic surfactants of the present invention include:

alkalisalts of dodecane-sulfonate, tetradecane-sulfonate, hexadecane sulfonate, octadecane-sulfonate or mixtures thereof alkalisalts of sulfonation products of dodecene, tetradecene, hexadecene, octadecene or mixtures thereof Alkylaryl sulfonates having 8–12 carbon atoms in the alkyl chain according to the present invention include:

alkalisalts of octylbenzenesulfonate, nonylbenzenesulfonate, decylbenzenesulfonate, dodecylbenzenesulfonate, butylnaphthalenesulfonate, hexylnaphthalenesulfonate, octylnaphthalenesulfonate or mixtures thereof The salts of $\alpha$-sulfofatty acids having 10–20 carbon atoms in the chain according to the present invention include:

mono- or di-alkali- or ammonia- or magnesium-salts of
    $\alpha$-sulfo-decanacid,
    $\alpha$-sulfo-dodecanacid,
    $\alpha$-sulfo-tetradecanacid,
    $\alpha$-sulfo-hexadecanacid,
    $\alpha$-sulfo-octadecanacid, or mixtures thereof or the above mentioned salts, whereby the carboxylic group is esterified with methanol, ethanol or propanol.

Nonionic emulsifiers used according to the present invention are the polyglycol ethers produced in the reaction of 3–30 moles of ethylene oxide with fatty alcohols having 10–20 carbon atoms, or with alkylphenols having 4–12 carbon atoms in the alkyl chain. These nonionic emulsifiers are used in amounts of between 0.2 and 2 parts, preferably 0.5–1.5 parts, based on 100 parts of monomer.

Specific examples of the polyglycol ethers produced in the reaction of 3–30 moles of ethylene oxide with fatty alcohols having 10–20 carbon atoms useful as the nonionic emulsifiers of the present invention include:

decanol oxethylated with 3 to 10 moles ethyleneoxide,
dodecanol oxethylated with 3 to 20 moles ethyleneoxide,
hexadecanol oxethylated with 10 to 30 moles ethyleneoxide, and
octadecanol oxethylated with 10 to 30 moles ethyleneoxide.

The polyglycol ethers produced in the reaction of 3–30 moles of ethylene oxide with alkylphenols having 4–12 carbon atoms in the alkyl chain include:

hexylphenol oxethylated with 3 to 30 moles ethylenexoide
octylphenol oxethylated with 3 to 30 moles ethyleneoxide
nonylphenol oxethylated with 3 to 30 moles ethyleneoxide
decylphenol oxethylated with 3 to 30 moles ethyleneoxide
dodecylphenol oxethylated with 3 to 30 moles ethyleneoxide The initiator employed in this invention is a water-soluble persulfate in a concentration of at least 0.5–2 parts, preferably 0.8–1.2 parts, based on 100 parts of monomer. Suitable in this connection are ammonium, sodium, or potassium peroxydisulfate, optionally in combination with sodium bisulfite or metabisulfite. Due to the good water solubility of ammonium peroxydisulfate, this compound is preferred.

The dispersion produced with the aid of the emulsifier-initiator combination of this invention contains a hardening and a plasticizing component, as well as an $\alpha$-$\beta$-unsaturated carboxylic acid. As the hardening component, styrene or substituted styrenes or mixtures thereof are utilized. Preferably employed is styrene. The hardening component is used in concentrations of 45–85 percent by weight, preferably 50–70 percent by weight.

The substituted styrenes useful in the present invention include:

$\alpha$-methylstyrene, p-methylstyrene, $\alpha$-methyl-p-methylstyrene, meta-ethylstyrene, p-isopropylstyrene, t-butylstyrene and halogenated derivates thereof.

As the plasticizing component, butadiene or substituted butadiene, such as isoprene or chlorobutadiene, are employed. Although butadiene is preferred, examples of the substituted butadienes useful in the present invention include:

2-methyl-butadiene, piperylene,
2,3-dimethyl-butadiene, chloroprene.

The plasticizing component is used in amounts of 15–55 percent by weight, preferably in quantities of 30–50 percent by weight. Suitable $\alpha$-$\beta$-unsaturated carboxylic acids having 3 to 5 carbon atoms are acrylic acid, methacrylic acid, maleic acid, fumaric acid, or itaconic acid. Acrylic acid is preferred in this connection. The α-β-unsaturated acids are used in amounts of between 0.5 and 5 percent by weight, preferably in quantities of between 1 and 3 percent by weight.

Preferred styrene-butadiene latices are those containing styrene and butadiene in a ratio of 2:1 to 1:1, as well as about 2 percent of acrylic acid.

As agents for controlling the molecular weight, it is possible to employ, for example, additionally mercaptans, such as tert.-dodecyl mercaptan, in amounts of between 0 and 1 percent by weight.

The dispersions of this invention are produced at temperatures of between 50 and 80° C.

It is surprising that, by the emulsifier-initiator system of this invention, all the aforementioned disadvantages are avoided and latices are obtained having a number of excellent properties. The basic idea of this invention resides in that the sum total of these good properties are attained only within a relatively narrow range of concentrations determined by the type and amount of emulsifier and initiator. When larger quantities of anionic emulsifiers are used, the particle size is reduced, resulting in a decrease in stability. Furthermore, this measure leads to low surface tensions. In particular, this becomes noticeable after the neutralizing step. Also the waterproofness is impaired by this measure. In the case of very small quantities (below 0.01 part) or when the anionic soap is omitted, the reaction times become very long, and the proportion of coagulate rises.

Two large amounts of nonionic emulsifier likewise result in a reduction of the waterproofness and the surface tension. When the nonionic emulsifier is eliminated entirely, the stability of the latex is too low, and the proportion of coagulate becomes too high.

The persulfate is an essential stabilizing factor. If the persulfate concentration is too low, the latices of this invention cannot be obtained, since the proportion of coagulate becomes too high. The stabilizing effect of the persulfate cannot be explained by the fact that a portion of the persulfate is effective as an electrolyte. The presence of a specific amount of an electrolyte is defined in various patents (e.g. U.S. Pat. 2,605,242) for obtaining large particles and a low latex viscosity. The fact that, in the present case, the stabilizing activity of the persulfate is not based on an electrolytic effect is demonstrated by following Comparative Example 5 (experiments 3-5), wherein part of the ammonium persulfate was replaced by ammonium sulfate, producing large amounts of coagulate.

The latices produced with the aid of the emulsifier-initiator system of the present invention can all be prepared in 50 percent solids content by means of a one-stage process. Accordingly, it is not necessary to conduct time-consuming concentration steps to obtain the solids contents required for processing the products into coating compositions. In the case of less stable dispersions of the prior art, the preparation of a latex having 50 percent by weight solid matter proceeds by way of several stages. First of all, the latex is produced with a solids content of 30-40 percent, then it is agglomerated, and finally concentrated to a solids content of 50 percent. It is advantageous in the production of the latices of the present invention to be able to introduce all required substances into the reaction vessel at the beginning of the process. The production is furthermore simplified by the fact that the conversion takes place very uniformly whereby the temperature control is made easy. The reaction is terminated after about 10-20 hours, and high conversions of at least 99.5 percent are obtained. A conversion of the monomers which is as complete as possible is desired, since the removal or recovery of residual monomers requires additional, voluminous process steps.

After the reaction is terminated, any coagulate present is separated by screening. The proportion of coagulate is always below 1.5 percent, generally below 1 percent. Due to the low emulsifier content, the dispersions of the present invention exhibit a high surface tension lying between 50 and 60 dyne/cm. After adjustment to a pH of 8.5 the surface tension drops to about 45-50 dyne/cm. and thus is at values which are considered an optimum for various purposes of application. The tendency of the dispersions toward foaming is minor, and thus the processing is simple, even on high speed machines. The dispersions adjusted to a pH of 8.5 exhibit an excellent electrolytic stability. All dispersions are stable with respect to an equal volume of a 10 percent strength NaCl solution. This electrolytic stability is paired with a good compatibility and fillability with pigments and fillers. Thus, the dispersion produced according to Example 1 can be filled with at least 300 percent of chalk.

The viscosity of the dispersions of this invention is low, even in the alkaline pH range. The efflux time in a 4 mm. Ford beaker ranges between 13 and 20 seconds. Dispersions having a similar solids content often exhibit rather high viscosities, for which reason they must sometimes be agglomerated in order to enhance their processability. Viscosities which are too high interfere, for example, in the incorporation of pigments and also in the production of coating compositions when further binders are added which have a thickening effect. In the case of the latices of the present invention, the incorporation of fillers is very simple.

The dispersions of the present invention exhibit superior film-forming properties and result in clear, dense films which are highly waterproof due to the minor content of emulsifier.

All of these properties render the latices of the present invention highly suitable for the production of coating composition for a great variety of fields of use, such as paper coatings, textile coatings, carpet coating, or paints.

EXAMPLES

The abbreviations appearing in the examples have the following meanings:

EA=oxyethylated lauryl alcohol having an average degree of oxyethylation of 17
EB=paraffin sulfonate mixture having an average carbon atom number of 14-15
EC=sodium nonylphenol sulfonate (50 percent)
ED=oxyethylated alkylphenol of 8 carbon atoms in the alkyl residue, having an average degree of oxyethylation of 20
EE=disodium-$C_{16}$/$C_{18}$-fatty acid α-sulfonate
EF=oxyethylated lauryl alcohol having an average degree of oxyethylation of 7
EG=oxyethylated aliphatic $C_{10}$-alcohol having an average degree of oxyethylation of 4
EH=oxyethylated alkylphenol of 8 carbon atoms in the alkyl residue, having an average degree of oxyethylation of 3
EI=oxyethylated alkylphenol of 8 carbon atoms in the alkyl residue, having an average degree of oxyethylation of 8

EXAMPLE 1

The following substances were introduced into a polymerization kettle of stainless steel having a capacity of 150 liters:

| Substance: | Parts by weight |
|---|---|
| Water | 100 |
| EA | 0.8 |
| EB | 0.05 |
| Styrene | 53 |
| Acrylic acid | 2 |
| tert.-Dodecyl mercaptan | 0.5 |
| Ammonium peroxydisulfate | 0.9 |

After purging the vessel three times with nitrogen and subsequent evacuation, 45 parts by weight of butadiene was introduced and the mixture heated to 70° C. After 18½ hours, the reaction was terminated. The proportion of coagulate was only 0.09 percent, the residual monomer content was 0.2 percent. The solids content amounted to 49.4 percent. The surface tension was, at a pH of 2.05, 55.5 dyne/cm. and, at a pH of 8.5, 47.4 dyne/cm. The dispersion, adjusted to a pH of 8.5, exhibited an efflux time of 14.5 seconds in a 4 mm. Ford beaker was stable with respect to an equal volume of 10 percent strength NaCl solution.

EXAMPLE 2

The following components were introduced into a stainless steel polymerization kettle having a capacity of 12 liters:

| Substance: | Parts by weight |
|---|---|
| Water | 100 |
| EA | 1.0 |
| Lauryl sulfate | 0.2 |
| Styrene | 65 |
| Acrylic acid | 2 |
| tert.-Dodecyl mercaptan | 0.5 |
| Ammonium peroxydisulfate | 0.8 |

After purging the vessel three times with nitrogen and evacuation, 32 parts by weight of butadiene was introduced and the mixture heated to 70° C. After 9½ hours, the reaction was terminated. The proportion of coagulate was only 0.4 percent, the residual monomer content was 0.3 percent. The solids content was 50.3 percent. The latex had a pH of 2.1 and a surface tension of 60.2 dyne/cm., after adjusting the pH-value to 8.5, the surface tension was 47.5 dyne/cm., and the efflux time in a 4 mm. Ford beaker was 16.5 seconds; the latex is stable with respect to an equal volume of 10 percent strength NaCl solution.

EXAMPLE 3

The following substances were filled into a polymerization kettle of stainless steel having a capacity of 150 liters:

| Substance: | Parts by weight |
|---|---|
| Water | 100 |
| EE | 0.05 |
| EA | 1.0 |
| Styrene | 66.5 |
| Acrylic acid | 1.5 |
| tert.-Dodecyl mercaptan | 0.5 |
| Ammonium peroxydisulfate | 0.9 |

After purging the reactor three times with nitrogen and evacuation, 32 parts by weight of butadiene was introduced and the mixture heated to 70° C. The reaction was terminated after 14½ hours. The proportion of coagulate was only 0.04 percent, the residual monomer content was 0.15 percent. The solids content amounted to 49.5 percent. The dispersion exhibited a pH of 2.1 and a surface tension of 54.8 dyne/cm. The dispersion, adjusted to a pH of 8.5, had a surface tension of 46.9 dyne/cm., an efflux time in a 4 mm. Ford beaker of 13.7 seconds, and was stable with respect to an equal volume of 10 percent strength NaCl solution.

EXAMPLE 4

(See Table I)

Experiments 1 through 7 correspond to Example 3 with respect to the monomer composition, but are conducted in a reactor having a capacity of 12 liters. The type and amount of the emulsifiers and the quantity of the peroxydisulfate were varied. In part, dispersions having more than 50 percent solids were produced.

EXAMPLE 5

The following components were introduced into a 12-liter polymerization kettle of stainless steel:

| Substance: | Parts by weight |
|---|---|
| Water | 100 |
| EA | 1.0 |
| Styrene | 82 |
| Acrylic acid | 3 |
| Ammonium peroxydisulfate | 0.8 |
| EC | 0.1 |

After purging the vessel three times with nitrogen and evacuation, 15 parts by weight of butadiene was introduced and the mixture heated to 70° C. After 13½ hours, the reaction was terminated. The proportion of coagulate was only 0.3 percent, the content of residual momomer was 0.15 percent. The solids content was 51.4 percent, the pH was 2.1, and the surface tension was 43.0 dyne/cm. The latex, adjusted to a pH of 8.5, exhibited a surface tension of 41.8 dyne/cm., an efflux time of 15.6 seconds in a 4 mm. Ford Beaker, and was stable with respect to an equal volume of 10 percent strength NaCl solution.

EXAMPLE 6

The following components were introduced into a stainless steel polymerization kettle having a capacity of 12 liters:

| Substance: | Parts by weight |
|---|---|
| Water | 100 |
| EA | 1.0 |
| EB | 0.5 |
| Styrene | 66 |
| Acrylic acid | 1.0 |
| tert.-Dodecyl mercaptan | 0.5 |

After purging the vessel three times with nitrogen and evacuation, 33 parts by weight of butadiene and 5 parts by weight of an ammonium preoxydisulfate solution (20 percent strength) were added under pressure, and the mixture was then heated to 70° C. The reaction was terminated after 12 hours. The proportion of coagulate was 0.7 percent, the residual monomer content was 0.02 percent. The solids content was 50.7 percent, the pH was 2.0, the surface tensino 51.0 dyne/cm. The dispersion, adjusted to a pH of 8.5, exhibited a surface tension of 43.7 dyne/cm., an efflux time of 15.4 seconds in a 4 mm. Ford beaker, and exhibited stability with respect to an equal volume of 10 percent strength NaCl solution.

EXAMPLE 7

The following substances were introduced into a 12 liter polymerization kettle of stainless steel:

| Substance: | Parts by weight |
|---|---|
| Water | 100 |
| EI | 0.8 |
| EB | 0.05 |
| Styrene | 58 |
| Acrylic acid | 2.0 |
| Ammonium peroxydisulfate | 1.0 |

After purging the vessel three times with nitrogen and evacuation, 40 parts by weight of butadiene was added under pressure and the mixture heated to 70° C. The reaction was terminated after 9 hours. The proportion of coagulate was 0.5 percent, the residual monomer content was 0.4 percent. The solids content was 50.3 percent, the pH was 1.9, the surface tension was 56.3 dyne/cm. The dispersion, adjusted to a pH of 8.5, exhibited a surface tension of 47.0 dyne/cm., an efflux time of 15.9 seconds in a 4 mm. Ford beaker, and was stable with respect to an equal volume of 10 percent strength NaCl solution.

TABLE I

| Experiment | Parts | | | Percent | | | Reaction time (hours) | σ.* dyne/ cm. | Resistant against 10% NaCl* |
| --- | --- | --- | --- | --- | --- | --- | --- | --- | --- |
| | Anionic emulsifier | Nonionic emulsifier | Ammonium persulfate | Coagulate | Solids | Residual monomer | | | |
| 1 | 0.02, EE | 1.0, EA | 0.9 | 0.5 | 50.7 | 0.03 | 18 | 48.7 | Yes. |
| 2 | 0.07, EE | 0.5, EA | 1.5 | 0.5 | 50.7 | 0.1 | 9 | 51.8 | Yes. |
| 3 | 0.07, EE | 1.5, EA | 0.5 | 1.5 | 50.3 | 0.05 | 12 | 48.1 | Yes. |
| 4 | 0.05, EB | 1.0, EA | 0.9 | 0.7 | 54.2 | 0.03 | 18 | 47.0 | Yes. |
| 5 | 0.063, EE | 1.0, ED | 0.9 | 0.5 | 50.3 | 0.05 | 14 | 48.7 | Yes. |
| 6 | 0.05, EB | 1.0, EF | 0.9 | 0.3 | 53.2 | 0.25 | 14 | 44.6 | Yes. |
| 7 | 0.063, EB | 1.0, EG | 0.9 | 0.3 | 51.7 | 0.5 | 19 | 42.8 | Yes. |

* At a pH of 8.5.

COMPARATIVE EXAMPLE 1

(U.S. 3,078,246)

The following components were introduced into a polymerization kettle of stainless steel having a capacity of 12 liters:

| Substance: | Parts by weight |
| --- | --- |
| Water | 96 |
| EH | 0.5 |
| EB | 1.0 |
| Styrene | 67 |
| tert.-Dodecyl mercaptan | 0.5 |

After purging the reactor three times with nitrogen and evacuation, 33 parts by weight of butadiene and 5 parts by weight of ammonium peroxydisulfate solution (20 percent strength) were added under pressure, and the mixture was heated to 70° C. The reaction was terminated after 11 hours. In this way, 53 percent of coagulate was obtained. The residual dispersion was very unstable.

COMPARATIVE EXAMPLE 2

Comparative Example 2 was conducted in correspondence with Comparative Example 1, except that the monomer mixture contained 1 part by weight of acrylic acid (as in Example 6). The reaction was violent, and was terminated after 7 hours. The proportion of coagulate was 3.2 percent; the dispersion, adjusted to a pH of 8.5, was unstable with respect to an equal volume of 10 percent strength NaCl solution.

COMPARATIVE EXAMPLE 3

(U.S. 3,423,351, Example 10)

The following substances were introduced into a 12 liter polymerization kettle;

| Substance: | Parts by weight |
| --- | --- |
| Water | 100 |
| EI | 3.6 |
| EC | 0.45 |
| Styrene | 60 |
| Potassium peroxydisulfate | 0.7 |

After purging the reactor three times with nitrogen and evacuation, 40 parts by weight of butadiene was added under pressure and the mixture heated to 70° C. The reaction was violent and terminated after 12 hours. The proportion of coagulate was 1.7 percent. The dispersion was extremely unstable.

COMPARATIVE EXAMPLE 4

(OS 1,595,308, Example 5)

The following substances were introduced into a polymerization kettle of stainless steel having a capacity of 12 liters:

| Substance: | Parts by weight |
| --- | --- |
| Water | 100 |
| ED | 4.0 |
| EC | 1.0 |
| Styrene | 66.5 |
| Acrylic acid | 1.5 |
| tert.-Dodecyl mercaptan | 0.5 |
| Potassium peroxydisulfate | 0.5 |

After purging the vessel three times with nitrogen and evacuation, 32 parts by weight of butadiene was added under pressure and the mixture heated to 70° C. The reaction lasted 13½ hours and was extremely violent at the beginning. The proportion of coagulate was 9 percent. The residual product was a paste which was not fluid any more; the surface tension and efflux time thereof could not be determined.

COMPARATIVE EXAMPLE 5

(See Table II)

Experiments 1 through 5 correspond to Example 3 with regard to the monomer composition, but are conducted in a 12 liter reactor. The type and amount of the emulsifiers and the quantity of the peroxy-disulfate were varied.

TABLE II

| | Parts | | | |
| --- | --- | --- | --- | --- |
| | Anionic emulsifier | Nonionic emulsifier | Ammonium persulfate | Coagulate, percent |
| Experiment: | | | | |
| 1 | | 1.0, EA | 0.9 | (¹) |
| 2 | 0.05, EB | | 0.9 | 10 |
| 3 | 0.05, EB | 1.0, EA | 0.4 | 30 |
| 4 | 0.05, EB | 1.0, EA | ² 0.4 | (¹) |
| 5 | 0.05, EB | 1.0, EA | ³ 0.4 | 23 |

¹ Completely coagulated.
² Plus 0.5 (NH₄)₂SO₄.
³ Plus 0.25 (NH₄)₂SO₄.

What is claimed is:

1. In a carboxylated styrene/butadiene latex composition comprising a polymerization product of monomers of:

A. about 45 to 85 percent by weight styrene or substituted styrenes;

B. about 15 to 55 percent by weight butadiene or substituted butadiene; and

C. about 0.5 to 5 percent by weight α-β-unsaturated carboxylic acids having 3 to 5 carbon atoms;

the improvement comprising a solids content of about 30 to 55 weight percent with a gel content less than about 1.5 weight percent and the following components employed in the polymerization and consisting essentially of:

D. about 0.01 to 0.5 parts by weight of an anionic emulsifier, based on 100 parts by weight of monomers A, B and C, selected from the group consisting of alkyl sulfates having 10–20 carbon atoms, alkyl sulfonates having 10–20 carbon atoms, alkylaryl sulfonates having 8–12 carbon atoms in the alkyl chain, ammonium salts of α-sulfofatty acids having 10–20 carbon atoms and alkali salts of α-sulfofatty acids having 10–20 carbon atoms;

E. about 0.2 to 2 parts by weight of a nonionic emulsifier, based on 100 parts by weight of monomers A, B and C, selected from the group consisting of polyglycol ethers obtained by the reaction of one mole of fatty alcohols having 10–20 carbon atoms with 3–30 moles of ethylene oxide, one mole of alkylphenols having 4–12 carbon atoms in the alkyl chain with 3–30 moles of ethylene oxide or mixtures thereof; and F. about 0.5–2 parts by weight of a water-soluble peroxydisulfate, based on 100 parts by weight of monomers A, B and C.

2. The composition of Claim 1, wherein the concentration of monomer A is about 50 to 70 percent by weight, monomer B is about 30 to 50 percent by weight, monomer C is about 1.0 to 3.0 percent by weight, anionic emulsifier D is about 0.04 to 0.2 parts by weight, nonionic emulsifier E is about 0.5 to 1.5 parts by weight and peroxydisulfate is about 0.8 to 1.2 parts by weight and said gel content is less than 1 weight percent.

3. The composition of Claim 2, wherein said peroxydisulfate is selected from the group consisting of ammonium peroxydisulfate, sodium peroxydisulfate and potassium peroxydisulfate.

4. In a process for the production of carboxylated styrene/butadiene latices of a high solids content from monomers, having a low viscosity, a high surface tension and a good electroyltic stability, in the presence of an anionic emulsifier and a nonionic emulsifier and at an elevated temperature, the improvement comprising the following components employed in the polymerization consisting essentially of:

A. about 0.01 to 0.5 parts by weight of said anionic emulsifier, based on 100 parts by weight of said monomers selected from the group consisting of alkyl sufates having 10-20 carbon atoms, alkyl sulfonates having 10-20 carbon atoms, alkylaryl sulfonates having 8-12 carbon atoms in the alkyl chain, ammonium salts of α-sulfofatty acids having 10-20 carbon atoms and alkali salts of α-sulfofatty acids having 10-20 carbon atoms;

B. about 0.2 to 2 parts by weight of said nonionic emulsifier, based on 100 parts by weight of said monomers, selected from the group consisting of polyglycol ethers obtained by the reaction of one mole of fatty alcohols having 10-20 carbon atoms with 3-30 moles of ethylene oxide, one mole of alkylphenols having 4-12 carbon atoms in the alkyl chain with 3-30 moles of ethylene oxide or mixtures thereof; and C. about 0.5-2 parts by weight of a water-soluble peroxydisulfate, based on 100 parts by weight of said monomers.

References Cited

UNITED STATES PATENTS

| | | | |
|---|---|---|---|
| 3,423,351 | 1/1969 | Pierce et al. | 260—83.7 |
| 3,215,647 | 11/1965 | Dunn | 260—847 |
| 3,401,134 | 9/1968 | Fantl et al. | 260—29.7 SQ |

FOREIGN PATENTS

| | | | |
|---|---|---|---|
| 969,115 | 9/1964 | Great Britain | 260—29.7 H |

ALLAN LIEBERMAN, Primary Examiner

T. DE BENEDICTIS, SR., Assistant Examiner

U.S. Cl. X.R.

260—29.7 H, T, SE 80.8